United States Patent [19]
Johnson et al.

[11] Patent Number: 6,050,542
[45] Date of Patent: Apr. 18, 2000

[54] LOW POWER SOLENOID PROPORTIONAL VALVE

[75] Inventors: Timothy L. Johnson; Christopher D. Cedzo, both of Erie, Pa.

[73] Assignee: Snap-Tite Technologies, Inc., Wilmington, Del.

[21] Appl. No.: 09/089,694

[22] Filed: Jun. 3, 1998

[51] Int. Cl.[7] .............................. F16K 31/02; F03B 31/00
[52] U.S. Cl. ............................... 251/129.15; 251/129.08; 137/625.65
[58] Field of Search .................... 251/129.07, 129.08, 251/129.15, 129.18; 137/625.65

[56] References Cited

U.S. PATENT DOCUMENTS

| | | | |
|---|---|---|---|
| 3,469,590 | 9/1969 | Barker | 251/129.08 |
| 3,633,869 | 1/1972 | Lehmann | 251/129.18 |
| 4,954,799 | 9/1990 | Kumar | 251/129.08 |
| 5,207,410 | 5/1993 | Wakeman | 251/129.15 |
| 5,629,660 | 5/1997 | Kenyon et al. | |
| 5,704,395 | 1/1998 | Kim | 137/625.65 |
| 5,853,028 | 12/1998 | Ness | 137/625.65 |
| 5,897,098 | 4/1999 | Nishinosono | 251/129.08 |

FOREIGN PATENT DOCUMENTS 698160  11/1964  Canada ......................... 251/14

Primary Examiner—Kevin Shaver
Assistant Examiner—David A. Bonderer
Attorney, Agent, or Firm—Woodling, Krost & Rust

[57] ABSTRACT

A solenoid valve employing a coil can cover and a top cover residing between the bobbin, the stop and the plunger is disclosed. The coil can cover and top cover perform efficiently resulting in less saturation and hysterisis. Low power operation is achieved. A plug valve and seal arrangement are provided in one end of the plunger to operate in conjunction with a square edged orifice formed at the exit of the body. A linear flow characteristic is achieved over mid range throttle positions which facilitate the flow control of natural gas, and propane and other such fuels at low pressures.

12 Claims, 3 Drawing Sheets

LOW POWER SOLENOID PROPORTIONAL VALVE

FIELD OF THE INVENTION

This invention relates to solenoid valves which have a proportional flow characteristic. The proportional flow characteristic is determined by the shape of the plug valve and the surrounding square edged orifice of the body seat. Low power operation is achieved by the use of a top cover and a coil can cover which are magnetic materials. These covers are separated by a gap. The gap resides between the bobbin, the top cover, the coil can cover, and the guide.

BACKGROUND OF THE INVENTION

U.S. Pat. No. 5,629,660 issued to Kenyon, et al. discloses a magnetic circuit and spring resulting in proportional control of the plunger. The patent to Kenyon, et al. does not, however, disclose a top cover and a coil can cover and a gap therebetween. The invention of Kenyon, et al. is directed toward use in heat transfer systems.

The present invention is for use with low pressure natural gas and propane and other similar materials. Specifically, the present invention is directed toward a systems which may operate as low as 0.25 psig. Typically, the present invention will see pressures in the range of 0.25 psig to perhaps 2.0 psig.

SUMMARY OF THE INVENTION

A low power proportional solenoid valve is disclosed. The coil can and top cover perform efficiently resolving in less saturation and hysterisis. Low power operation is achieved. A plug valve and seal arrangement are provided in one end of the plunger to operate in conjunction with the square edged orifice formed at the exit of the body. A linear flow characteristic is achieved over mid-range throttle positions which facilitates the accurate flow control of natural gas and propane and other such fuels at low pressures. Mid-range throttle positions are between 20% and 80% of the plunger travel. In this range flow will increase proportionally with the movement of the plunger.

Electrical current is supplied to the coil. The voltage is 12 volts DC with a wattage of 3 watts. Those skilled in the art will realize that changing the gap size between the top cover and the coil can cover will change the amount of power used to operate the solenoid plunger and valve. Similarly, those skilled in the art will appreciate that a different number of turns of the coil may also result in changed electrical characteristics.

It is desirable to achieve low power operation so that hysterisis and saturation will be minimized. It takes additional time for the saturation affect to decrease and that is a function of the power applied to the solenoid coil. It has been found that the aforementioned conditions work well to achieve linear flow control between 20% and 80% travel of the plunger.

An adjusting screw is threadably inserted into the stop which allows for accurate calibration of the spring which resides between the adjustable screw and the plunger. In this way quality control in regard to spring constants is easily maintained. The plunger includes first and second slots and first and second notches to allow for movement of the plunger in either the open direction or the closed direction. These slots and notches provide a path for the air or gas which resides generally between the plunger and the stop and adjusting screw to be evacuated or to be permitted to fill the volume when the plunger is being closed.

Accordingly, it is an object of the present invention to provide a low power proportional solenoid valve. The low power operation is achieved by the sizing of the gap between the top cover and the coil can cover. This gap is also influenced by the magnetic guide and the permiance of the circuit is a function of the magnetic top cover, the magnetic coil can cover, the magnetic guide and the magnetic plunger.

It is an object of the present invention to provide a linear flow characteristic for low pressure natural gas, propane, and other similar fuels. The low pressure characteristic is controlled by the shape of the orifice which is formed by a passageway in combination with a seat on the body. The plug valve shape is also important in obtaining this linear flow characteristic.

It is an object of the present invention to provide a solenoid valve which is simple and easy to construct. Additionally it is an object of the present invention to provide a solenoid valve which would not require that the valve be re-piped if it should fail. Namely, it is an object of the solenoid valve of the present invention to provide a flange nut which secures the guide to the body. The guide, in turn, is welded to the stop. An access groove is provided to facilitate welding of the guide to the stop. The invention further provides a lock nut which is threadably engaged to the stop which in turn engages the top cover which in turn engages the coil can cover which in turn engages the flange nut. Those skilled in the art will readily observe that the flange nut may be eliminated in other designs of the invention without departing from the spirit and the scope of the teachings herein.

The object of the invention will be better understood when taken in connection with the Brief Description of the Drawings which follows together with the Description of the Invention and the claims.

DESCRIPTION OF THE INVENTION

Figure 1:
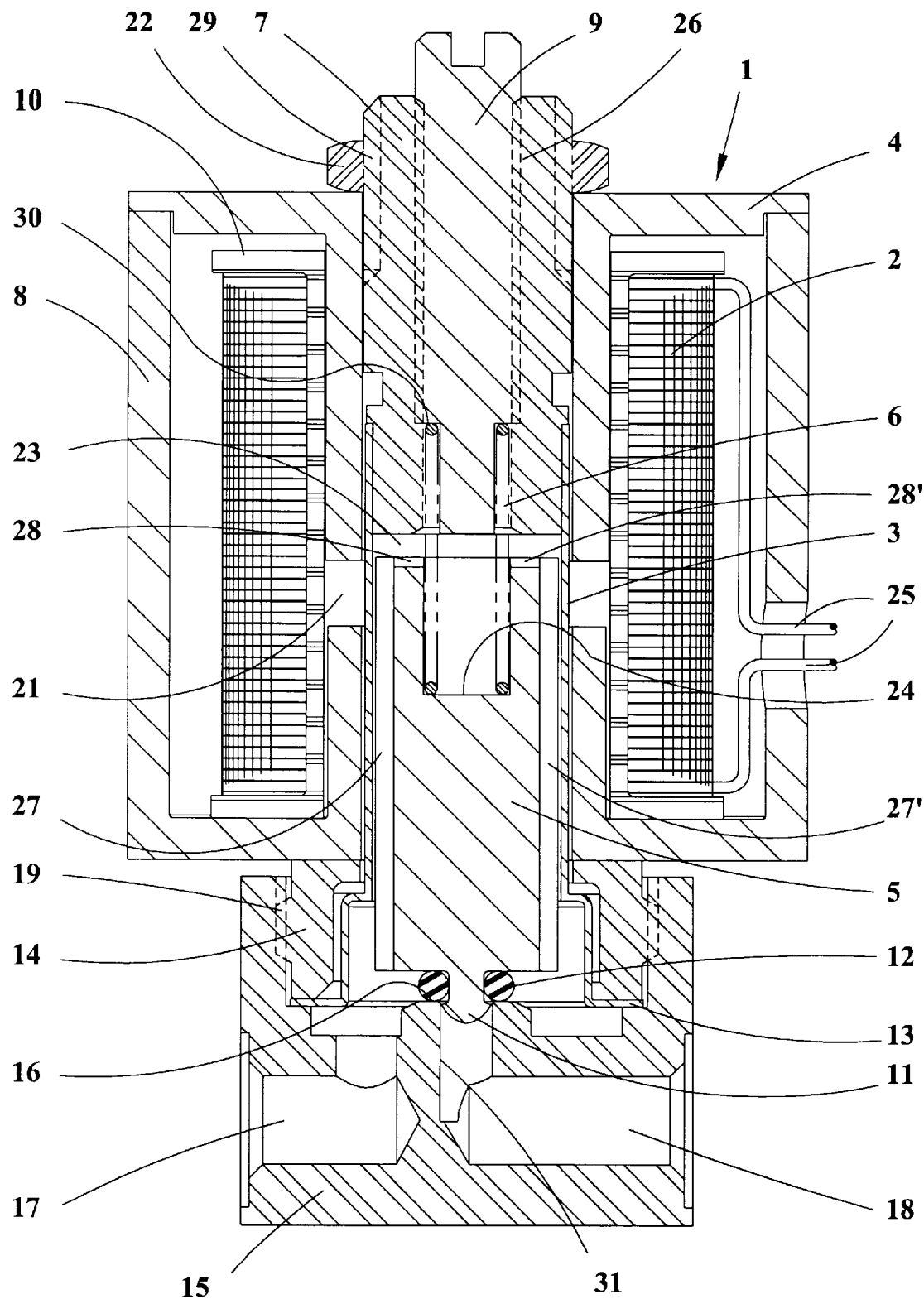
FIG. 1 is a cross-sectional view of the solenoid valve in the closed position.

FIG. 1 is a cross-sectional view of the solenoid valve in the closed position. Reference numeral 1 denotes the proportional solenoid valve. Coil 2 is wound around bobbin 10. Varying numbers of turns may be used for the coil to generate differing amounts of flux as will be understood by those skilled in the art. Leads 25 are the power connections to the coil 2.

Stop 7 is generally cylindrically shaped as are most of the components of the invention as those skilled in the art will understand. Stop 7 includes interior threads 26 for engagement mating threads on the adjusting screw 9. Adjusting screw 9 functions to position spring 6 and to accommodate for any quality variations in the spring constant. Stop 7 also includes exterior threads for engagement with a hexagonal nut 22. As will be seen hereinbelow hexagonal nut 22 engages the top cover 4 which in turn engages the coil can cover 8 which in turn engages the flange nut 14.

Returning to FIG. 1, and specifically to stop 7, it will be noticed that there is an unnumbered slot which is on the exterior of the stop 7. This unnumbered slot is used to facilitate welding of the guide 3 to the stop 7. The guide 3 is welded to the stop 7 and when viewing FIG. 1 it is apparent that no gas can escape because guide 3 is welded to the stop 7. Natural gas or other fuel or air will be present in gap 23 between the plunger 5 and the stop 7. Further gas will also attempt to escape through the threaded interconnection between the adjusting screw 9 and the stop 7. However, locktite sealant or some other similar metal sealant will prohibit the escape of natural gas or other similar material.

Spring 6 resides between shoulder 30 on the adjusting screw 9 and the spring seat 24 on the plunger 5. The plunger 5 also includes a first slot 27 and a second slot 27'. The plunger 5 also includes a first notch 28 and a second notch 28' at what would be viewed as the top of the plunger in FIG. 1. These slots and notches allow gas to flow up to the gap 23 and to flow down to the body 15 of the solenoid valve. It will be understood by those skilled in the art that perhaps only one slot may be necessary. Balancing and weight are factors to be considered in the design of the plunger as the slots facilitate movement of the plunger because it weighs less with the slot and the notches. However, the slots do somewhat decrease the magnetic circuit in that area where they occur. Therefore, the slots and their number and position are balanced against the efficiency of the magnetic circuit.

The plunger 5 also includes a plug valve or what is sometimes referred to as a throttling plug 11. Throttling plug 11 actually resides down in but does not necessarily contact the passageway 31 that leads from the second port 18. The passageway 31 which is cylindrically shaped and acts to somewhat guide the plug valve 11 in its movement. The O-ring 12 in the closed position seals the flow against the valve seat 16 on the body 15. The valve seat is a machined surface and the edge of the cylindrical passageway 31 forms a square edged orifice on the valve seat. This is important in obtaining a linear flow characteristic as the plunger 5 moves upward as shown in FIG. 2.

The body 15 includes a first port 17. Flange nut 14 secures the guide 3 against the body 5. Flange nut 14 is threadably interconnected with the body 15. Reference numeral 19 indicates the threaded interconnection between the flange nut 14 and the body 15. Gap 21 is very important to this invention and resides between the coil can cover 8, bobbin 10, top cover 4, and the guide 3. The sizing of the gap is essential to providing a lower power magnetic circuit. Most solenoid valves do not have the coil can cover or the top cover residing between the coil and the guide and the plunger. The nature of the top cover acting in concert with the guide and the coil can cover is to provide a very efficient circuit and this in effect allows the lowering of the power neededo move the plunger.

Figure 2:
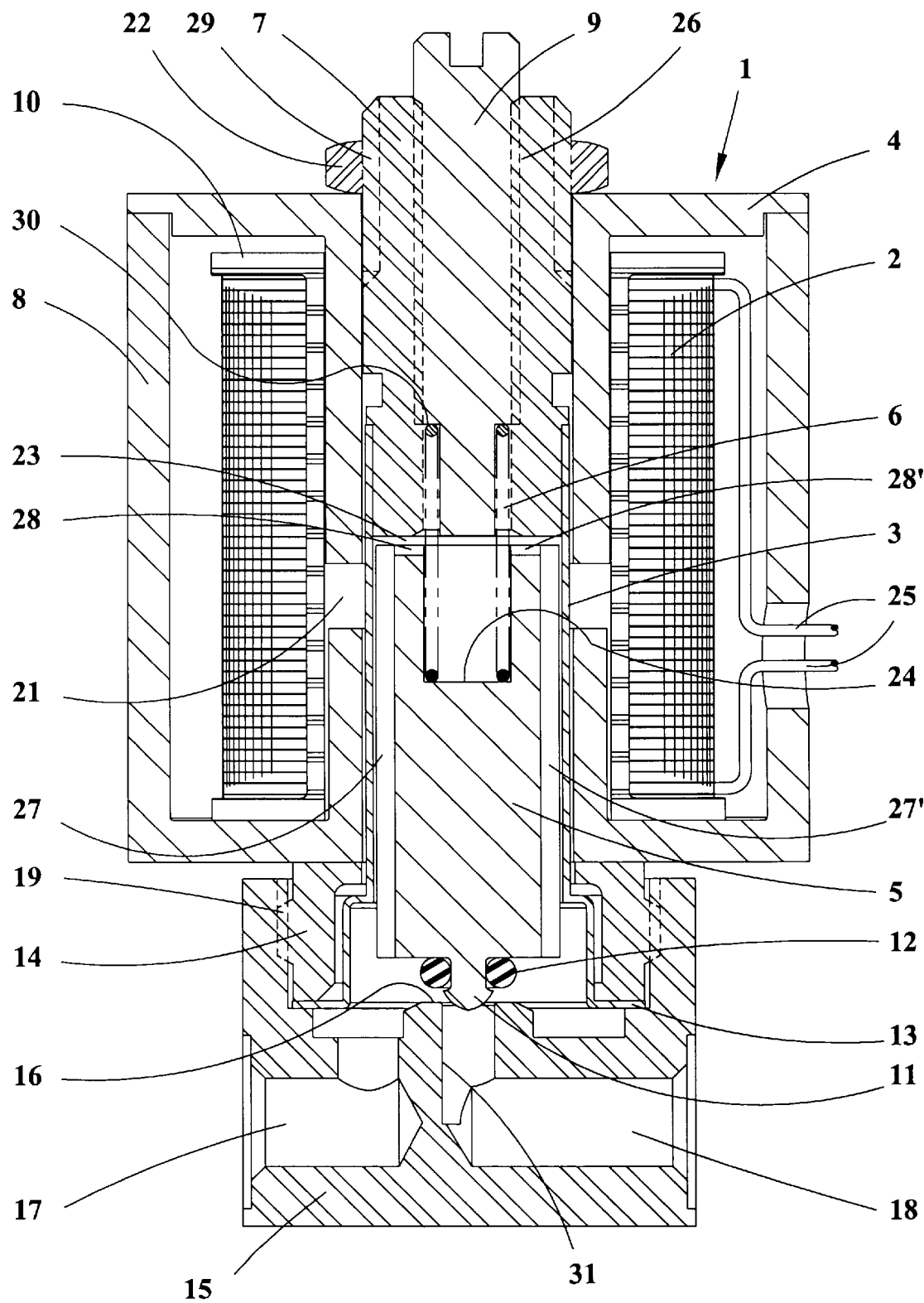
FIG. 2 is a cross-sectional view similar to that of FIG. 1 illustrated in the partially open position.

FIG. 2 is substantially identical to FIG. 1 with the exception that the plunger is shown in an intermediate position having been raised off of its seat. Gap 23 in FIG. 2 is much smaller than gap 23 in FIG. 1 which is the closed position of the solenoid. The plug valve 11 in combination with the valve seat 16 of the body has been found to provide a proportional and linear flow characteristic between 20 and 80 percent travel of the valve plunger and plug.

Figure 3:
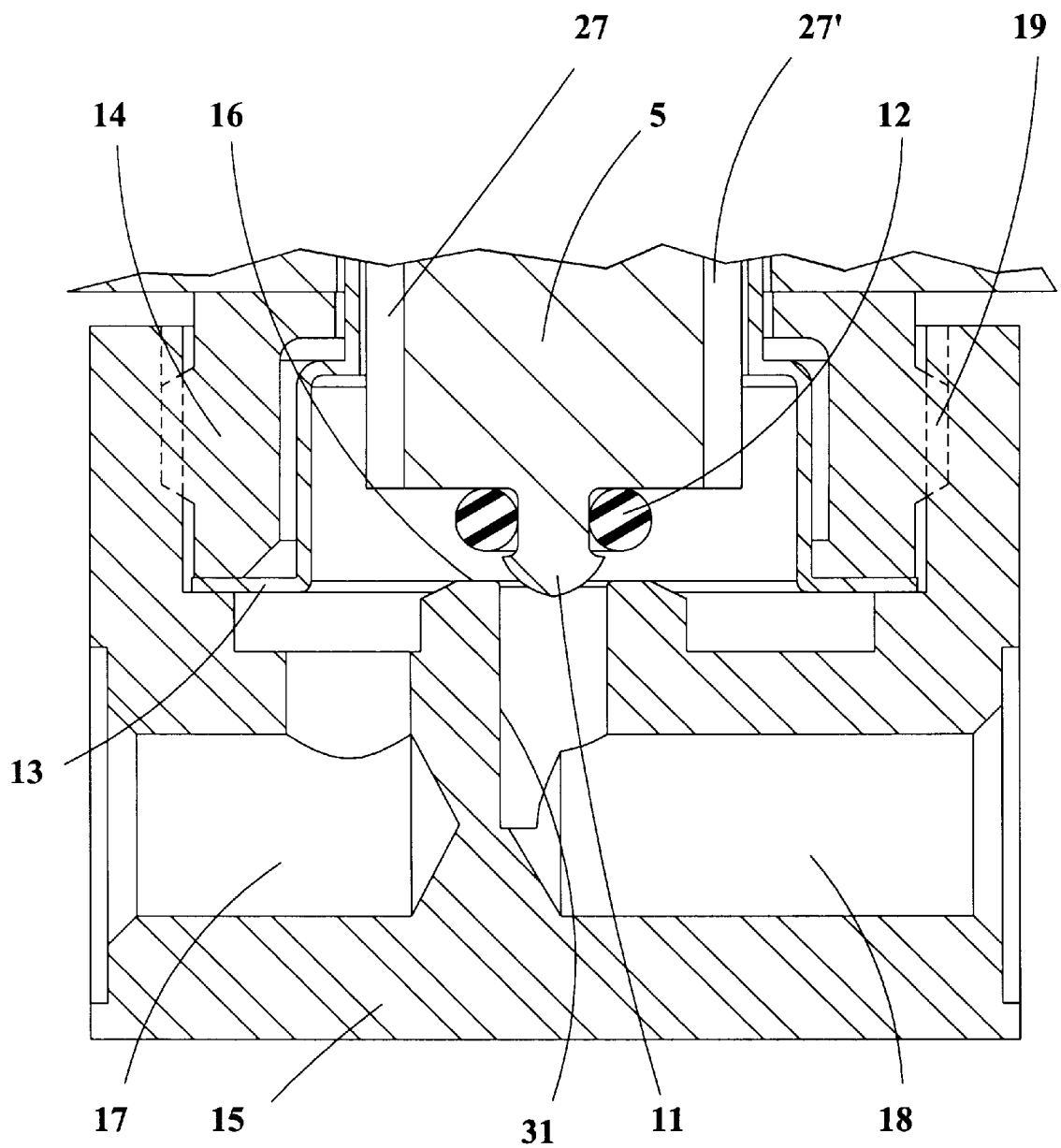
FIG. 3 is an enlarged view of a portion of FIG. 2 illustrating the plug valve in the partially open position.

FIG. 3 is a cutaway view of the body 15 and the valve plug 11 and the flange nut 14 shown in an enlarged form. This will enable the visualization of the interaction between the plug valve 11 and the square edged orifice formed on the body 15. The square edged orifice was chosen because considerable data is available about them so as to enable the sizing of the orifices and to produce the required flow rates. Nominally the system operates in the range of 0.25 to 2.0 psig. FIG. 3 also enable a better view of the flange 13 on guide 3 being secured against the body 15.

The foregoing description is not intended to limit the invention or the claims. Those skilled in the art will readily recognize several modifications without departing from the spirit or scope of the invention.

We claim:

1. A solenoid valve comprising a plunger; a stop; an adjustable screw; a spring residing between said plunger and said adjustable screw; said adjustable screw being threaded in said stop and adjustable in relation to said stop; a top cover; a bobbin; a coil can cover; a coil would around said bobbin; said bobbin engaging said top cover and said coil can cover; a guide welded to said stop; an annular gap between said top cover, said coil can cover and said bobbin; a body; said body includes a first port and a second port; said plunger includes a plug valve at one end thereof; said body includes a valve seat; a passageway communicating between said second port and said valve seat 5; a seal adjacent said plug valve which engages said valve seat when said plug valve and said plunger are in the closed position; a flange nut threaded to said body securing said guide into engagement with said body; and, a nut threaded to said stop securing said top cover against and into engagement with said coil can cover and securing said coil can cover against and into engagement with said flange nut.

2. A solenoid valve as claimed in claim 1 wherein said plunger includes a first and second slot and a first and second notch to prevent said plunger and said stop from locking together.

3. A solenoid valve as claimed in claim 1 wherein said plug valve resides partially in said passageway communicating between said second port and said valve seat.

4. A solenoid valve comprising a plunger; a stop; an adjusting screw within said stop; a bobbin and a coil wound around said bobbin; a guide; a top cover and a coil can cover; a gap between said guide, said top cover and said coil can cover; a spring between said plunger and said adjusting screw within said stop; a body having a passageway therethrough; said plunger communicating with said passageway; a second gap between said plunger and said stop; and said plunger movable with respect to said body in proportion to the current through said coil.

5. A solenoid valve as claimed in claim 4 wherein said plunger includes a plug valve at one end thereof and said body includes a valve seat residing circumferentially about said passageway.

6. A solenoid valve as claimed in claim 5 wherein said passageway is generally cylindrically shaped and wherein said passageway forms a square edged orifice where said passageway terminates at said valve seat.

7. A solenoid valve as claimed in claim 6 wherein said plunger includes a first slot for breaking vacuum or allowing pressure to escape when said plunger or nearly abuts said stop.

8. A solenoid valve as claimed in claim 6 wherein said coil attracts said plunger and said plug valve away from said body in response to the current through the coil.

9. A solenoid valve as claimed in claim 8 wherein said plug valve and said square edged orifice provide a linear flow characteristic through said body.

10. A solenoid valve as claimed in claim 5 further comprising a seal adjacent to said plug valve.

11. A solenoid valve as claimed in claim 10 wherein said seal engages said valve seat when said plunger and said plug valve are in the closed position.

12. A method for assembling a solenoid valve having a stop, an adjusting screw, a guide, a spring, a body, a coil can cover, a bobbin, a top cover, and a coil, comprising the steps of:

threading an adjusting screw into said stop;

welding a guide to said stop;

placing a spring between said adjusting screw and said plunger;

screwing said guide to said body;

sliding a coil can cover over said guide;

placing a bobbin having a coil would around said bobbin in said coil can cover;

sliding said top cover around said guide and said stop and between said bobbin; and, securing said top cover and said coil can cover to said body.

* * * * *

UNITED STATES PATENT AND TRADEMARK OFFICE
CERTIFICATE OF CORRECTION

PATENT NO : 6,050,542
DATED : April 18, 2000
INVENTOR(S): Timothy L. Johnson, et al.

It is certified that error appears in the above-identified patent and that said Letters Patent are hereby corrected as shown below:

Col. 1, line 23, delete "systems", insert -- system --.

* Col. 3, line 55, after delete "needed" and insert -- needed to --.

Col. 4, line 28, after "seat", delete "5".

Col. 4, line 66, after "plunger", insert -- abuts --.

Signed and Sealed this

Third Day of April, 2001

Attest:

NICHOLAS P. GODICI

*Attesting Officer*   *Acting Director of the United States Patent and Trademark Office*